Patented Oct. 3, 1950

2,524,432

UNITED STATES PATENT OFFICE 2,524,432

ESTERS OF EPOXY ALCOHOLS WITH PROPENOIC COMPOUNDS

George L. Dorough, Niagara Falls, N. Y., assignor to E. I. du Pont de Nemours & Company, Wilmington, Del., a corporation of Delaware No Drawing. Application August 17, 1945, Serial No. 611,244

2 Claims. (Cl. 260—348)

This invention relates to new compositions of matter and more particularly to polymerizable compounds.

This invention has as an object a new class of compounds which are useful for the production of plastic and polymeric materials and which are also useful in their monomeric form for various purposes. Further objects reside in methods for obtaining these compounds. Other objects will appear hereinafter.

The above objects are accomplished by reacting an esterifiable epoxy compound with an esterifiable propenoic compound under substantially neutral or alkaline conditions. More particularly the new compounds described herein are obtained by reacting an epoxy alcohol, for example, 2,3-epoxy propanol, or its ester forming derivative, for example, the halogen analogue with a propenoic acid or the ester forming derivative of such acid. Still more particularly the new compounds described herein are obtained by reacting an epoxy alcohol, or its ester forming derivative with an alpha, beta-ethylenically unsaturated monocarboxylic acid or the ester forming derivative of such an acid.

The esterification reaction as generally practiced is carried out by first charging a reaction vessel with an alkali metal salt of the alpha, beta-unsaturated carboxylic acid in a water medium present in sufficient amount to provide a solution of the salt. For this purpose the acid is usually mixed in the reaction vessel with an aqueous solution of alkali hydroxide. To this solution is added an inhibitor, for example, cuprous chloride, to prevent polymerization of the product. The mixture is agitated at room temperature and epihalohydrin is added dropwise. When the reaction is complete, the contents of the reaction vessel are discharged and the reaction product is isolated by distillation or by other procedure.

The acids used in the practice of this invention are those of the general formula

wherein R is selected from the group consisting of hydrogen and monovalent organic radicals, and R' is selected from the group consisting of hydrogen, halogen and monovalent organic radicals. Acids of this kind are the alpha, beta-ethylenically unsaturated monocarboxylic acids, e. g., acrylic and methacrylic acids and the butenedioic acids such as maleic and fumaric acids. In place of the above mentioned acids there can be used their ester forming derivatives such as the anhydrides, acyl halides, esters, salts, and amides.

The invention is further illustrated by the following examples in which the parts are by weight.

Example I

To a cold solution of 80 parts of sodium hydroxide in 400 parts of water is slowly added 172 parts of methacrylic acid. The resulting solution of the sodium salt of methacrylic acid is cooled and the pH adjusted to exactly 7.0. Then 5 parts of cuprous chloride is added, the mixture is stirred rapidly, and the dropwise addition of 180 parts of epichlorohydrin is carried out. A maximum temperature rise of 15° C. occurs during the early portion of this addition. The mixture is stirred for a total of 18 hours at ambient laboratory temperatures and is then extracted four times with a total of 450 parts of ether. The ether extract is dried over anhydrous magnesium sulfate. The ether is removed on a steam bath and the residue fractionated under vacuum after adding 1 g. of cuprous chloride. The following fractions are taken:

| No. | B. P. | Amt., Parts | |
|---|---|---|---|
| 1 | 42° C./24 mm. to 50° C./17 mm. | 76 | Unchanged epichlorohydrin. |
| 2 | 50° C./17 mm. to 90° C./16 mm. | 4 | |
| 3 | 90–115° C./16 mm. | 28 | |
| 4 | 102–117° C./2 mm. | 15 | Very viscous oil. |

Refractionation of combined fractions 2 and 3 gives 25 parts of product boiling at 67–70° C./3 mm. which is the desired 2,3-epoxypropyl methacrylate, represented by the formula

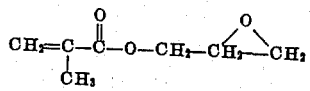

The production of polymers and of copolymers from epoxy esters obtained by the practice of this invention is illustrated by the following examples.

Example II

A mixture of 5 parts of the ester prepared as in

Example I with 0.005 part of benzoin as a polymerization accelerator is exposed under a nitrogen atmosphere in a Pyrex vessel to the light of a Westinghouse H-4 lamp at a distance of 6 inches. After one hour the mixture will no longer flow when the vessel is inverted. Exposure is continued for an additional 17 hour period to give a slightly yellow, somewhat soft casting which can be hot pressed to a pliable sheet.

*Example III*

A mixture of 153 parts of vinyl chloride, 17 parts of the ester prepared as in Example I, and 0.4 part of lauroyl peroxide is sealed in a glass container under nitrogen and heated at 35° C. for 9 days. The container is cooled and opened, and the unpolymerized portion poured off. The remaining polymerized product, after drying, amounts to 21 parts. Analysis indicates the presence of 42.7% copolymerized vinyl chloride. A hot pressed sheet of the product is substantially colorless and shows excellent resistance to discoloration on aging. On aging there is a gradual increase in hardness and a decrease in thermoplasticity and solubility so that after a 2-month period the product is no longer soluble in cyclohexanone and broken pieces cannot be re-fused by heating at 160° C. under 2,000 lbs./sq. in. pressure.

*Example IV*

Mixtures of freshly distilled methyl-alpha-chloroacrylate with the 2,3-epoxypropyl methacrylate prepared as described in Example I, in the following proportions:

| Sample | Per Cent Methyl Chloroacrylate | Per Cent 2,3-Epoxypropyl Methacrylate |
|---|---|---|
| A | 95 | 5 |
| B | 90 | 10 |
| C | 100 | 0 | are polymerized by heating under nitrogen at 45° C. for 64 hours followed by 148 hours at 65° C. At the end of this time C has developed a definite yellow color, while A and B are colorless. Blocks are cut from each of the polymers and after polishing, they are heated in air at 100° C. for 7 days. At the end of this time neither A nor B shows any distortion and both A and B are substantially colorless, while C has a pronounced yellow color.

*Example V*

A mixture of 40 parts of acrylonitrile and 10 parts of 2,3-epoxypropyl methacrylate, prepared as described in Example I, is agitated at 40° C. under nitrogen with a solution of 0.5 part of ammonium persulfate and 0.1 part of sodium bisulfite in 200 parts of water. After 24.5 hours the precipitated polymer is filtered off, washed with water and alcohol and dried at room temperature. The yield is 80 parts and analysis shows the 2,3-epoxypropyl methacrylate content to be 20%. The polymer is not soluble in dimethyl formamide, a solvent for unmodified polyacrylonitrile.

A copolymer of acrylonitrile with 2,3-epoxypropyl methacrylate prepared by bulk polymerization in the presence of benzoyl peroxide is readily soluble in dimethyl formamide. A film of such copolymer on aging, particularly in an acidic environment, becomes insoluble and substantially infusible.

The epoxy esters of unsaturated acids described herein can be made by various methods, such as by acid interchange, alcohol interchange, and reaction of the alcohol with the acid anhydride or halide.

Further examples of epoxy alcohols and ester-forming derivatives thereof which are suitable in the practice of the present invention are epoxy oleyl alcohol, epoxy octadecanol, epoxydodecanol, 5,6-epoxyhexanol-2, 3,4-epoxy-2,2,4-trimethyl pentanol-3, beta-hydroxy ethyl ethylene oxide, 3-hydroxy-1,2-oxidocyclohexane, alpha-hydroxy-methyl-alpha-phenylethylene oxide, 3,4-dihydroxybenzyl ethylene oxide, and the like.

Examples of alpha, beta-ethylenically unsaturated acids or their ester-forming derivatives which can be used in place of metacrylic acid and acrylic acid are alpha-chloracrylic acid, alpha-phenyl acrylic acid, ammonium acrylates and methacrylates, crotonic acid, cinnamic acid, sorbic acid, beta-benzylacrylic acid, benzoylacrylic acid, beta-acetylacrylic acid, beta-furylacrylic acid, 4-ethyloctadien-2, 4-oic acid, hexadienoic acid, 5,9-dimethyldecatrien-2,4-8-oic acid, ($\Delta^{1,3}$-cyclohexadienyl)-propenoic acid, acrylyl chloride, methyl acrylate, ethyl methacrylate. Examples of butenedioic acids and their esters and salts are maleic and fumaric acids and their esters, such as diethyl maleate, diethyl fumarate, etc., sodium, potassium, and ammonium, fumarates and maleates, etc.

In place of water such reaction media as aliphatic or aromatic hydrocarbons, ethers, dioxan, and chlorinated hydrocarbons can be employed.

The reaction is best conducted with the esterifiable epoxy compound and the alpha, beta-unsaturated acid or its derivative in substantially mole proportions or under conditions providing for a slight deficiency of the esterifiable compound, thereby minimizing the formation of side reaction products. The reaction temperatures can range from 0° C. to 100° C. When it is desired to avoid polymerization, temperatures of 20° or lower and up to 30° are the most suitable.

The esters which are normally liquid are usually isolated and purified by fractional distillation. To minimize losses through polymerization of the ester, the fractional distillation is carried out in the presence of a polymerization inhibitor, such as copper chloride, copper acetate, copper resinate, copper propionate, p-phenylene diamine, hydroquinone, and the like.

Valuable products are obtained by polymerizing the epoxy esters either alone or with other polymerizable compounds and particularly with vinyl and vinylidene compounds. Further examples of such polymerizable compounds include the methyl, ethyl, and octyl esters of acrylic, methacrylic and alpha-chloroacrylic acids, and the amides of these acids, e. g., acrylamide, methacrylamide, etc.; styrene, chlorostyrenes, vinyl acetate, methyl vinyl ketone, butadiene, isoprene, chloro-2-butadiene-1,3, fluoro-2-butadiene-1,3, 5-ethyl-2-vinylpyridine, 2-vinyl pyridine, vinyl furane, methacrylonitrile, acrylonitrile, methylene malonic esters, vinylidene chloride, vinyl fluoride, and fumaric and maleic esters.

The esters of this invention are useful as copolymeric stabilizers against heat degradation of normally unstable polymers, e. g., polyvinyl chloride, chlorinated polyethylenes, chlorinated rubber, and the like.

The polymers and copolymers described herein when hydrolyzed or subjected to conditions leading to scission of the ethylene oxide ring are susceptible of cross-linking and consequent insolubilization.

As many apparently widely different embodiments of this invention may be made without departing from the spirit and scope thereof, it is to be understood that this invention is not thereby limited to the specific embodiments thereof, except as defined in the appended claims.

I claim:
1. 2,3-epoxypropyl methacrylate.
2. A methacrylic acid ester of an epoxy alcohol in which there is a single epoxy oxygen which bridges adjacent carbon atoms.

GEORGE L. DOROUGH.

REFERENCES CITED

The following references are of record in the file of this patent:

UNITED STATES PATENTS

| Number | Name | Date |
|---|---|---|
| 2,089,569 | Orthner et al. | Aug. 10, 1937 |
| 2,129,666 | Barrett et al. | Sept. 13, 1938 |
| 2,335,813 | Stein | Nov. 30, 1943 |
| 2,470,324 | Staudinger et al. | May 17, 1949 |

FOREIGN PATENTS

| Number | Country | Date |
|---|---|---|
| 518,057 | Great Britain | Feb. 15, 1940 |

OTHER REFERENCES

Kester et al.: "Glycidyl Esters of Aliphatic Acids," article in Jourl. Organic Chemistry, vol. 8, pages 550–556, (1943).

Chemical Abstracts 22, 2921 (1928).